2,947,714
Patented Aug. 2, 1960

2,947,714
PREPARATION OF RESINS FROM DIISOCYANATES

René Leclercq, Woluwe-Saint-Pierre, and René Paquet, Braine-le-Comte, Belgium, assignors to Union Chimique Belge, S.A., Brussels, Belgium, a corporation of Belgium No Drawing. Filed June 4, 1957, Ser. No. 663,363

Claims priority, application Belgium June 22, 1956

2 Claims. (Cl. 260—24)

It is well known that isocyanates react with monoalcohols or monophenols to produce monomeric urethanes.

The diisocyanates react with the monoalcohols or monophenols at high temperature to give resins, but the latter are of little interest, because either the heating time necessary for the preparation thereof is excessive, or the adherence to metal is unsatisfactory or their resistance to chemical agents is insufficient.

However, the above rule is not general. Thus, patent application Ser. No. 628,000, filed December 13, 1956, describes the preparation of resins by reaction of diisocyanates with furfuryl alcohol, some of these resins being at the same time easy to prepare, adherent and resistant. On the other hand, in our copending patent application entitled "Preparation of resins from abietyl alcohols," now Patent No. 2,867,644, resins having a high resistance to chemical agents have been prepared from diisocyanates and abietyl alcohols.

These abietyl alcohols are found in varying proportions in the product sold by Hercules Powder Co. under the name of "Abitol." It probably results from the reduction of natural abietic acids. This product generally contains 14–23% of abietyl alcohol, 36–39% of dihydroabietyl alcohol and 38–50% of tetrahydroabietyl alcohol.

In United States Patent No. 2,867,644, referred to above, in addition to aliphatic diisocyanates, e.g. hexamethylene diisocyanate, the use of particular aromatic diisocyanates, e.g. methylene-bis-(4-phenyl-isocyanate), 3,3'-dimethoxy-4,4'-diphenylene diisocyanate and toluene-2,4-diisocyanate, is specifically illustrated.

The present invention relates to the preparation of resins from diisocyanates and mixtures of monoalcohols with, in some cases, one or more monophenols.

The diisocyanates, suitable for this preparation, are of the general formula OCN—R—NCO, in which R is a bivalent aliphatic or aromatic radical. At least one diisocyanate is used for the preparation of the resins.

The mixtures of monoalcohols and monophenols contain on the one hand abietyl alcohols, benzyl alcohol or furfuryl alcohol and on the other hand monohydroxylated compounds selected from the group consisting of the aforesaid alcohols, allyl alcohol and monophenols.

The mixtures of monoalcohols and monophenols which have been used are more especially:
Furfuryl alcohol and abietyl alcohols,
Furfuryl alcohol, abietyl alcohols and one or more monophenols;
Furfuryl alcohol and one or more other monoalcohols,
Furfuryl alcohol, abietyl alcohols, benzyl alcohol and one or more monophenols,
Abietyl alcohols and one or more other monoalcohols,
Abietyl alcohols, one or more other monoalcohols and one or more monophenols,
Abietyl alcohols, benzyl alcohol and one or more monophenols,
Benzyl alcohol and one or more monophenols.

The presence of the phenol generally increases the adherence of the resins in an outstanding manner.

The compositions of these mixtures vary within very wide limits, but it is advisable to take a molecular ratio between diisocyanates and monoalcohols or diisocyanates and monoalcohols-monophenols of about 1:1. The relative quantities of monoalcohols or monoalcohols-monophenols can vary in any proportions, the properties of the resins prepared are obviously a function of these proportions.

The reaction is exothermic with certain diisocyanates, especially when these are aromatic. It is generally necessary to heat the reaction mixture to a temperature between 100 and 300° C. for about 8 hours in order to obtain a good resin. The colour of the resins is frequency reduced by working in an inert atmosphere, (nitrogen or carbon dioxide, for example). The elimination of the volatile products is easier by completing the heating under reduced pressure.

The resins obtained can be used to make a varnish which is resistant to chemical agents, but they can be used for other purposes, such as paints, insulators, etc.

The following examples describe the preparation of several resins. All the mixtures indicated above have not been included and the examples do not limit the invention in any way. The object of these examples is to show the properties of the products obtained in some particular cases.

Example 1

168 g. of hexamethylene diisocyanate (commercial product "Desmodur H" of Farbenfabriken Bayer A.G.) are reacted with 78.5 g. of furfuryl alcohol and 53.2 g. of abietyl alcohols in the form of Abitol into a 1–litre flask, fitted with a stirrer and a reflux condenser, the reaction taking place in a carbon dioxide atmosphere. The mixture is heated for 8 hours at 160–170° C. and 289 g. of a deep red resin are obtained. The molecular weight of the resin, determined by cryoscopy, is equal to 1080.

50 g. of the reaction product are taken and dissolved in 50 g. of toluene. A varnish is obtained which, when oven-dried (30 minutes at 170° C.), has a high resistance to bases and acids, even when these are strong.

Example 2

Under the same conditions as in Example 1, 168 g. of hexamethylene diisocyanate (Desmodur H) are reacted with 75.2 g. of phenol and 53.2 g. of abietyl alcohols in the form of Abitol. The mixture is heated for 8 hours at 160–170° C. and 292 g. of a clear resin are obtained with a molecular weight equal to 980 (cryoscopic method).

50 g. of this resin dissolved in 50 g. of toluene give a varnish which, when spread on a copper plate and dried in an oven (30 minutes at 170° C.), adheres strongly to this plate, is infusible at 170° C. and has a high resistance to concentrated and even strong bases.

Example 3

Under the same conditions as in Example 1, 168 g. of hexamethylene diisocyanate (Desmodur H) are reacted with 47 g. of phenol and 54 g. of benzyl alcohol. The mixture is heated for 8 hours at 160–170° C. and there are obtained 262 g. of a clear resin with a molecular weight of 1150 (by cryoscopy).

50 g. of this resin dissolved in 50 g. of toluene give a varnish which, when spread on a copper plate and dried in an oven (30 minutes at 170° C.), adheres strongly and has a high resistance to strong bases in concentrated solutions.

Example 4

Under the same conditions as in Example 1, 168 g.

of hexamethylene diisocyanate (Desmodur H) are reacted with 31.3 g. of phenol, 36 g. of benzyl alcohol and 88 g. of abietyl alcohols (Abitol of Hercules Powder Co.). Heating is carried out for 8 hours at 170° C. and there are obtained 318 g. of a clear resin.

50 g. of this resin, dissolved in 50 g. of toluene, give a varnish which, when spread on a copper plate and dried in an oven (30 minutes at 170° C.), adheres well and has a perfect resistance to dilute acids and to strong bases in concentrated solutions.

*Example 5*

168 g. of hexamethylene diisocyanate, 20 g. of allyl alcohol, 88.6 g. of abietyl alcohols in the form of Abitol and 31.3 g. of phenol are reacted in a carbon dioxide atmosphere in a 1-litre flask. Heating is carried out for 8 hours at 160–170° C. and there are obtained 298 g. of a clear yellow resin.

50 g. of this resin, dissolved in 50 g. of toluene, give a varnish which, when spread on a metal plate and dried in an oven (30 minutes at 170° C.), has a good resistance to bases, even when these are strong.

*Example 6*

168 g. of hexamethylene diisocyanate, 36 g. of benzyl alcohol, 31.3 g. of phenol and 73.2 g. of nonyl phenol are reacted in a carbon dioxide atmosphere in a 1-litre flask. The flask is heated for 8 hours at 160–170° C. and there are obtained 304 g. of a clear yellow resin. When dried in an oven as in the previous examples, this resin has a very good adherence to polished metal plates and a good resistance to even strong bases.

*Example 7*

168 g. of hexamethylene diisocyanate, 37.6 g. of phenol, 53.2 g. of abietyl alcohols and 39.2 g. of furfuryl alcohol are reacted in a carbon dioxide atmosphere in a 1-litre flask. After reacting for 8 hours at 160–170° C., there are obtained 288 g. of a brown resin. When dried in an oven as in the foregoing examples, this resin has a good resistance to even strong bases.

We claim:

1. A process for the preparation of diisocyanate resins which comprises reacting at a temperature between 100 and 300° C. and in the presence of an inert gas, materials consisting essentially of at least one diisocyanate of the general formula OCN—R—NCO wherein R is selected from the group consisting of aliphatic and aromatic bivalent radicals with a mixture of at least two monohydroxylated compounds selected from the group consisting of allyl, benzyl, furfuryl and abietyl alcohols, phenol and nonylphenol, the molecular ratio of the diisocyanate to the monohydroxylated compounds used being about 1:1.

2. A diisocyanate resin prepared by reacting with one another reactants at a temperature between 100 and 300° C. and in the presence of an inert gas, said reactants consisting of (*a*) at least one diisocyanate of the general formula OCN—R—NCO wherein R is selected from the group consisting of aliphatic and aromatic bivalent radicals and (*b*) a mixture of at least two monohydroxylated compounds selected from the group consisting of allyl, benzyl, furfuryl and abietyl alcohols, phenol and nonylphenol, the molecular ratio of the diisocyanate to the monohydroxylated compounds used being about 1:1.

References Cited in the file of this patent

UNITED STATES PATENTS

| 2,801,990 | Seeger et al. | Aug. 6, 1957 |

FOREIGN PATENTS

| 904,089 | France | Oct. 25, 1945 |
| 944,331 | France | Apr. 1, 1949 |